United States Patent
Tsai et al.

(10) Patent No.: US 12,507,119 B2
(45) Date of Patent: Dec. 23, 2025

(54) NETWORK CONNECTION CONTROL SYSTEM AND METHOD

(71) Applicant: Compal Electronics, Inc., Taipei (TW)

(72) Inventors: Tsung-Hsuan Tsai, Taipei (TW); Yi-Ching Chen, Taipei (TW); Ching-Yu Chen, Taipei (TW)

(73) Assignee: Compal Electronics, Inc., Taipei (TW)

( * ) Notice: Subject to any disclaimer, the term of this patent is extended or adjusted under 35 U.S.C. 154(b) by 350 days.

(21) Appl. No.: 18/220,771

(22) Filed: Jul. 11, 2023

(65) Prior Publication Data
US 2024/0022961 A1    Jan. 18, 2024

Related U.S. Application Data (60) Provisional application No. 63/389,097, filed on Jul. 14, 2022, provisional application No. 63/467,090, filed on May 17, 2023.

(51) Int. Cl.
*H04W 28/16* (2009.01)
*H04W 28/08* (2023.01)
*H04W 28/086* (2023.01)

(52) U.S. Cl.
CPC ... *H04W 28/0861* (2023.05); *H04W 28/0967* (2020.05); *H04W 28/16* (2013.01)

(58) Field of Classification Search
CPC ......... H04W 28/0967; H04W 28/0861; H04W 28/16; H04W 12/0433; H04W 12/06; H04W 12/069
See application file for complete search history.

(56) References Cited

U.S. PATENT DOCUMENTS 10,959,101 B2    3/2021    Mohen Venkatakrishnan et al.
11,514,134 B2    11/2022   Ronagh et al.
(Continued)

FOREIGN PATENT DOCUMENTS

CA    2840958 C    1/2013
CN    111260109 A  6/2020
(Continued)

OTHER PUBLICATIONS

Davide Venturelli et al., Reverse Quantum Annealing Approach to Portfolio Optimization Problems, arXiv:1810.08584, Oct. 25, 2018.
(Continued)

*Primary Examiner* — Anez C Ebrahim
(74) *Attorney, Agent, or Firm* — KIRTON McCONKIE; Evan R. Witt (57) ABSTRACT

A network connection control system and method is provided. The network connection control system includes user equipments, base stations, a server and first and second processing units. Each user equipment transmits a network parameter between it and every base station to the server through the base station connected therewith. The first processing unit assigns CIO set values corresponding to the base station. The network connection control system is configured to perform an optimizing procedure. In the optimizing procedure, according to the CIO set values, the network parameters, the throughput objective function and connection and network resource constraints of all the user equipments and base stations, the first and second processing units processes based on classical algorithm and quantum annealing algorithm respectively to obtain the optimized connection configuration.

22 Claims, 4 Drawing Sheets

(56) References Cited

U.S. PATENT DOCUMENTS

| | | | |
|---|---|---|---|
| 2013/0201316 A1* | 8/2013 | Binder | H04L 67/12 |
| | | | 701/2 |
| 2018/0246851 A1 | 8/2018 | Zaribafiyan et al. | |
| 2019/0068443 A1 | 2/2019 | Li et al. | |
| 2019/0132066 A1 | 5/2019 | Park et al. | |
| 2020/0311591 A1 | 10/2020 | Bernoudy et al. | |
| 2020/0382361 A1 | 12/2020 | Chandrasekhar et al. | |
| 2021/0133670 A1* | 5/2021 | Cella | G06N 3/044 |
| 2021/0157312 A1* | 5/2021 | Cella | G01M 13/045 |
| 2021/0216897 A1 | 7/2021 | Woerner et al. | |
| 2021/0248489 A1 | 8/2021 | Yarkoni | |
| 2021/0335638 A1 | 10/2021 | Manassen et al. | |
| 2022/0012387 A1 | 1/2022 | Suzuki et al. | |
| 2022/0124508 A1 | 4/2022 | Geitz et al. | |
| 2023/0327969 A1 | 10/2023 | Saravanan et al. | |
| 2024/0224063 A1 | 7/2024 | Saravanan et al. | |

FOREIGN PATENT DOCUMENTS

| | | |
|---|---|---|
| TW | 202117474 A | 5/2021 |
| TW | 202404414 A | 1/2024 |
| WO | 2020227721 A1 | 11/2020 |
| WO | 2021257128 A2 | 12/2021 |

OTHER PUBLICATIONS

Yue Xu et al., Load Balancing for Ultra-Dense Networks: A Deep Reinforcement Learning Based Approach, IEEE, Dec. 2019.

\* cited by examiner

NETWORK CONNECTION CONTROL SYSTEM AND METHOD

CROSS-REFERENCE TO RELATED APPLICATION

This application claims the benefit of U.S. Provisional Application No. 63/389,097 filed on Jul. 14, 2022, entitled "MOBILE NETWORK OPTIMIZE PROBLEM SOLVED BY QUANTUM ANNEALING ALGORITHM", and U.S. Provisional Application No. 63/467,090 filed on May 17, 2023, entitled "MOBILITY LOAD BALANCING HYBRID QUANTUM CLASSICAL ALGORITHM". The entire contents of the above-mentioned patent applications are incorporated herein by reference for all purposes.

FIELD OF THE INVENTION

The present disclosure relates to a network connection control system and method, and more particularly to a network connection control system and method based on hybrid quantum-classical algorithm.

BACKGROUND OF THE INVENTION

The current 5G (the 5th generation mobile communication technology) RAN intelligent control usually deal with the MLB (mobility load balancing) problem of network through rule-based manner, which is also used in 4G network. However, in the 5G network, since the number of connection devices increases significantly, the rule design for the 5G network would become much more complicated and inefficient, and it is hard to take the load balancing of the overall network into consideration.

In addition, some prior arts may attempt to utilize the deep-learning-based manner to deal with the MLB problem. Although the deep-learning-based manner is sufficient to deal with the MLB problem under a specific network architecture, it also has obvious disadvantages. In detail, in the deep learning-based manner, the design process includes data collection, model training and model deployment. After a 5G field is built, the data collection and the model training are performed according to the number and distribution of the built base stations and the distribution of user equipments. However, if the 5G field is replaced or changed, the data collection and the model training must have to be performed again, which limits the expandability of the deep-learning-based manner.

Therefore, there is a need of providing a network connection control system and method in order to overcome the drawbacks of the conventional technologies.

SUMMARY OF THE INVENTION

The present disclosure provides a network connection control system and method. In the network connection control system and method, an optimized connection configuration of all the user equipments and all the base stations is obtained through the processing based on hybrid quantum-classical algorithm, and the connection ranges of all the base stations are controlled to realize the optimized connection configuration. Accordingly, the network connection control system and method of the present disclosure is able to find out the currently optimal connection configuration at any time point so as to realize the load balancing of the overall network and the best overall throughput. In addition, through adopting the hybrid approach that combines the quantum annealing algorithm and the classical algorithm for processing, the required number of quantum bits is greatly reduced. Further, even when the network field is replaced or changed, there is no need to perform the data collection and the model training again, resulting in good expandability of the network connection control system and method of the present disclosure.

In accordance with an aspect of the present disclosure, a network connection control system is provided. The network connection control system includes a plurality of user equipments, a plurality of base stations, a server, a first processing unit and a second processing unit. Each base station has a connection range and is configured to connect with the user equipment located within the connection range. The server is in communication with the plurality of base stations, and the server controls the connection range of each of the plurality of base stations through adjusting CIO values of the plurality of base stations. The first and second processing units are in communication with the server respectively. Each user equipment transmits a network parameter between the user equipment and every one of the plurality of base stations to the server through the base station connected therewith. The first processing unit sets current connection configuration of the plurality of user equipments and the plurality of base stations as a reference connection configuration and sets a reference overall throughput according to a total throughput of the plurality of user equipments under the reference connection configuration. The first processing unit assigns a plurality of CIO set values corresponding to the plurality of base stations. The network connection control system is configured to perform an optimizing procedure. In the optimizing procedure, the first processing unit processes based on classical algorithm according to the plurality of CIO set values, all the network parameters and connection constraints of the plurality of user equipments and the plurality of base stations to obtain a temporary connection configuration. The server generates a QUBO matrix according to the temporary connection configuration and a network resource condition. The second processing unit processes the QUBO matrix based on quantum annealing algorithm to obtain a temporary overall throughput of the plurality of user equipments. The first processing unit confirms whether the temporary overall throughput is greater than the reference overall throughput. If the first processing unit confirms that the temporary overall throughput is greater than the reference overall throughput, the temporary connection configuration is determined as an optimized setting, and the server adjusts the connection configuration to be identical with the temporary connection configuration.

In accordance with another aspect of the present disclosure, a network connection control method is provided. The network connection control method includes steps of: (a) providing a plurality of user equipments, a plurality of base stations, a server, a first processing unit and a second processing unit, wherein each of the plurality of base stations has a connection range and is configured to connect with the user equipment located within the connection range, the server is in communication with the plurality of base stations and controls the connection range of each of the plurality of base stations through adjusting CIO values of the plurality of base stations, and the first processing unit and the second processing unit are respectively in communication with the server; (b) controlling each of the plurality of user equipments to transmit a network parameter between the user equipment and every one of the plurality of base stations to the server through the base station connected therewith, setting current connection configuration of the plurality of user equipments and the plurality of base stations as a reference connection configuration by the first processing unit, and setting a reference overall throughput according to a total throughput of the plurality of user equipments under the reference connection configuration by the first processing unit; (c) assigning a plurality of CIO set values corresponding to the plurality of base stations by the first processing unit; (d) according to the plurality of CIO set values, all the network parameters and connection constraints of the plurality of user equipments and the plurality of base stations, processing based on classical algorithm to obtain a temporary connection configuration by the first processing unit; (e) generating a QUBO matrix according to the temporary connection configuration and a network resource condition by the server, and processing the QUBO matrix based on quantum annealing algorithm to obtain a temporary overall throughput of the plurality of user equipments by the second processing unit; (f) confirming whether the temporary overall throughput is greater than the reference overall throughput; and (g) if the temporary overall throughput is confirmed to be greater than the reference overall throughput, determining the temporary connection configuration as an optimized setting, and adjusting the connection configuration to be identical with the temporary connection configuration.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
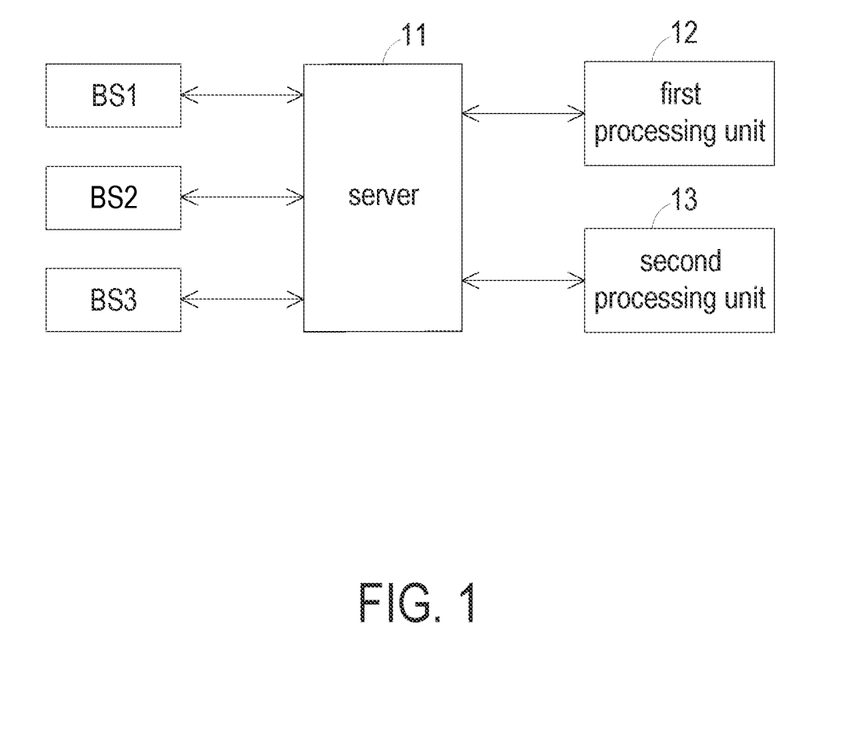
FIG. 1 is a schematic block diagram illustrating base stations, a server, a first processing unit and a second processing unit of a network connection control system according to an embodiment of the present disclosure.
Figure 2:
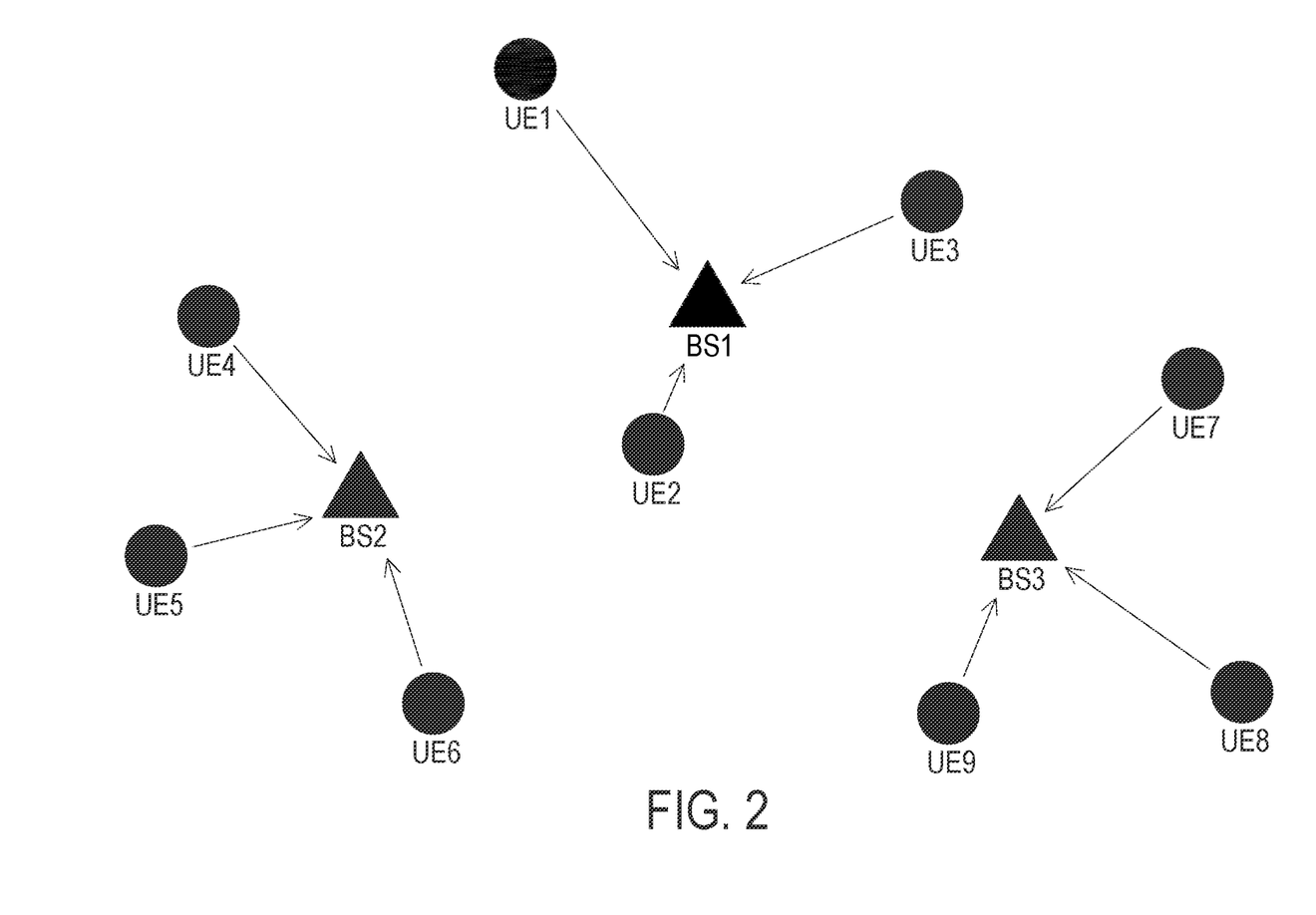
FIG. 2 is a schematic view illustrating base stations and user equipments of a network connection control system according to an embodiment of the present disclosure.

FIG. 1 is a schematic block diagram illustrating base stations, a server, a first processing unit and a second processing unit of a network connection control system according to an embodiment of the present disclosure. FIG. 2 is a schematic view illustrating base stations and user equipments of a network connection control system according to an embodiment of the present disclosure. As shown in FIG. 1 and FIG. 2, the network connection control system includes a plurality of user equipments, a plurality of base stations, a server 11, a first processing unit 12 and a second processing unit 13. The server 11 may include a CPU (central processing unit), a GPU (graphics processing unit) or a FPGA (field programmable gate array), but not exclusively.

Three base stations BS1, BS2 and BS3 and nine user equipments UE1, UE2, UE3, UE4, UE5, UE6, UE7, UE8 and UE9 are exemplified in FIG. 1 and FIG. 2, while the specific number of the user equipments and base stations is not limited thereto. Each base station has a connection range and is configured to connect with the user equipment located within the connection range thereof. The server 11 is in communication with all the base stations. The server 11 may control the connection range of each base station through adjusting CIO (cell individual offset) values of the base stations, thereby controlling the user equipment to connect the designated base station. The first processing unit 12 and the second processing unit 13 are respectively in communication with the server 11. The first processing unit 12 may be a conventional computer that operates on binary bits. The second processing unit 13 may be a quantum or digital annealing machine that operates on quantum bits or bits, such as a D-wave quantum annealer or Fujitsu digital annealer.

There is a network parameter between any one user equipment and any one base station, and the network parameter includes the parameter which reflects the connection quality and/or the resource required for the connection between the user equipment and the base station. For example, the network parameter may include the number of resource blocks required for connecting the user equipment to the base station, the RSRP (reference signal received power) between the user equipment and the base station, and/or the SINR (signal to interference plus noise ratio) between the user equipment and the base station, but not limited thereto. Each user equipment transmits a network parameter between it and every base station to the server 11 through the base station connected therewith. Taking the user equipment UE1 in FIG. 2 as an example, if the user equipment UE1 is currently connected to the base station BS1, the network parameter between the user equipment UE1 and the base station BS1, the network parameter between the user equipment UE1 and the base station BS2, and the network parameter between the user equipment UE1 and the base station BS3 are all transmitted to the server 11 through the base station BS1.

Initially, each user equipment may be connected to a certain base station according to the signal strength. The first processing unit 12 sets the current connection configuration of all the user equipments and all the base stations as a reference connection configuration, and sets a reference overall throughput according to a total of the throughput of all the user equipments under the reference connection configuration. Further, the first processing unit 12 assign a plurality of CIO set values corresponding to all the base stations. The network connection control system performs an optimizing procedure to obtain the optimized connection configuration of all the user equipments and all the base stations.

The connection configuration mentioned above includes the connection relations between each user equipment and each base station. For example, FIG. 2 exemplifies a connection configuration. In the connection configuration shown in FIG. 2, the user equipments UE1, UE2 and UE3 are connected to the base station BS1, the user equipments UE4, UE5 and UE6 are connected to the base station BS2, and the user equipments UE7, UE8 and UE9 are connected to the base station BS3. In addition, each base station has fixed network resources that can be allocated, and the minimum allocation unit is one resource block. For each base station, since the signal strength (SINR) of the base station connected to each user equipment is different, the amount of data transmitted between the base station and each user equipment by one resource block is also different. The optimized connection configuration mentioned above allows the user equipments in the overall network system to achieve the largest throughput by using the fixed number of resource blocks.

In the optimizing procedure, firstly, according to all the CIO set values, all the network parameters and connection constraints of all the user equipments and base stations, the first processing unit 12 processes based on the classical algorithm to obtain the corresponding temporary connection configuration. The connection constraints may include the requirement that each user equipment can be connected to one base station only and/or the maximum number of the user equipments connected to each base station, but not limited thereto. In addition, when the network connection control system is applied to 5G network, the connection constraints may include the A3 event of the measurement events in 5G network. The A3 event represents that the base station connected to the user equipment is switched from the first base station to the second base station when the trigger condition is satisfied. For example, the trigger condition is that the difference of subtracting the RSRP between the user equipment and the first base station from the RSRP between the user equipment and the second base station is greater than the CIO value between the first and second base stations.

Then, the server 11 generate a QUBO matrix according to the temporary connection configuration and a network resource condition. The network resource condition includes all the network parameters, a throughput objective function and network resource constraints of all the user equipments and base stations. The network resource constraints are related to the constraints about allocating the source blocks. For example, the network resource constraints may include a requirement that the number of the resource blocks allocated to the user equipment should not exceed the number of the resource blocks required by the user equipment, the total number of the resource blocks provided by one base station and/or the resource block distribution manner which is able to perform Round-Robin schedule, but not limited thereto.

Afterwards, the second processing unit 13 processes the QUBO matrix based on quantum annealing algorithm to obtain the temporary overall throughput of all the user equipments. The quantum annealing algorithm used by the second processing unit 13 may include SA (simulated annealing), DA (digital annealing), SQA (simulated quantum annealing) or SBA (simulated bifurcation algorithm), but not exclusively.

Finally, the first processing unit 12 confirms whether the temporary overall throughput is greater than the reference overall throughput. If the first processing unit 12 confirms that the temporary overall throughput is greater than the reference overall throughput, the temporary connection configuration is determined as an optimized setting, and the server 11 adjusts the connection configuration of all the user equipments and base stations to be identical with the temporary connection configuration. On the contrary, if the first processing unit 12 confirms that the temporary overall throughput is less than or equal to the reference overall throughput, the first processing unit 12 modifies the CIO set values, and the network connection control system performs the above optimizing procedure again. As an example, the first processing unit 12 may adopt a gradient descent algorithm or a heuristic algorithm to modify the CIO set values, but not limited thereto.

Since the reference overall throughput set initially is an important criterion for determining whether the optimization procedure should be ended. The reference overall throughput is for example but not limited to equal 1.1 times the total of the throughput of all the user equipments under the reference connection configuration.

According to the above descriptions, the network connection control system and method of the present disclosure is able to find out the currently optimal connection configuration at any time point so as to realize the load balancing of the overall network and the best overall throughput. In addition, through adopting the hybrid approach that combines the quantum annealing algorithm and the classical algorithm for processing, the required number of quantum bits is greatly reduced. Further, even when the network field is replaced or changed, there is no need to perform the data collection and the model training again, resulting in good expandability of the network connection control system and method of the present disclosure.

The CIO set values assigned initially may affect the processing result of the succeeding optimizing procedure. Therefore, when the optimizing procedure is repeated for an excessively long time or is repeated for too many times, the CIO set values are reassigned and the optimizing procedure is performed again in order to achieve better temporary overall throughput. In specific, in an embodiment, when the first processing unit 12 confirms that the temporary overall throughput is less than or equal to the reference overall throughput, the first processing unit 12 further determines whether a restart condition is satisfied under the current circumstance. If the determination result is positive (i.e., the restart condition is satisfied), the first processing unit 12 reassigns the CIO set values, and then the network connection control system performs the optimizing procedure again. If the determination result is negative (i.e., the restart condition is not satisfied), the first processing unit 12 modifies the CIO set values, and then the network connection control system performs the optimizing procedure again. The restart condition may include that a preset time has passed after assigning the CIO set values or that the number of times of performing the optimizing procedure after assigning the CIO set values last time exceeds a preset number of times, but not exclusively.

In addition, during the optimizing procedure, the processing is based on the throughput objective function related to the overall throughput and the various constraints in order to maximize the overall throughput. The specific expressions of the throughput objective function and various kinds of constraints are exemplified as follows, but not limited thereto actually.

Supposing that the network connection control system includes m base stations and n user equipments, the specific throughput objective function Obj may be exemplified as:

$$Obj = -\sum_{j=1}^{m}\sum_{i=1}^{n}\left(\sum_{k=1}^{x_{ij}}10t_{jk} + \sum_{k=0}^{2}2^k d_{ijk} + d_{ij3}\right)x_{ij}c_{ij}\frac{1}{D_i \cdot n \cdot m} \cdot \frac{10^{-6}}{t_{slot}}. \quad (1)$$

$x_{ij}$ represents whether the user equipment UEi is connected to the base station BSj, $x_{ij}$ equals 1 if the user equipment UEi is connected to the base station BSj, and xi; equals 0 if the user equipment UEi is not connected to the base station BSj. $t_{jk}$ and $d_{ijk}$ are binary variables that represent the number of the resource blocks allocated to the user equipment. $\overline{K}_{ij}$ represents the tens digit of the number of the resource blocks required by the user equipment UEi from the base station BSj. $D_i$ is the throughput required by the user equipment UEi. $c_{ij}$ is the capacity of each resource block used between the base station BSj and the user equipment UEi connected to the base station BSj, and $c_{ij}$ reflects the transmission efficiency of resource block.

The expressions of six kinds of constraints, including the first to sixth constraints, are exemplified as follows.

The first constraint is that each user equipment can be connected to one base station only, and the binary form of the expression thereof is:

$$C_1 = \sum_{i=1}^{n}\left(\sum_{j=1}^{m}x_{ij} - 1\right)^2 \qquad (2)$$

The second constraint is the maximum number of the user equipments connected to one base station. Taking the maximum number equal to 128 as an example, the binary form of the expression of the second constraint is:

$$C_2 = \sum_{j=1}^{m}\left(\sum_{i=1}^{n}x_{ij} + \sum_{k=0}^{7}2^k r_{jk} - 128\right)^2, \qquad (3)$$

where $r_{jk}$ is a slack variable.

The third constraint is that the number of the resource blocks allocated to a UE should not exceed the number of the resource blocks required by the UE, and the binary form of the expression thereof is:

$$C_3 = \sum_{j=1}^{m}\sum_{i=1}^{n}\left(w_{ij} - \overline{w}_{ij} - \sum_{k=0}^{2}2^k s_{ijk}\right)^2, \qquad (4)$$

where $s_{ijk}$ is a slack variable, $w_{ij}$ represents the number of the resource blocks required by the user equipment UEi from the base station BSj, and $\overline{w}_{ij}$ represents the number of the resource blocks actually given to the user equipment UEi from the base station BSj. The binary form of the expression of $\overline{w}_{ij}$ is shown as:

$$\overline{w}_{ij} = \sum_{k=1}^{\overline{K}_{ij}}10 t_{jk} + \sum_{k=0}^{2}2^k d_{ijk} + 2d_{ij3}. \qquad (5)$$

The fourth constraint is the total number of the resource blocks can be provided by one base station. Since the highest power of variables in the QUBO matrix is two, new binary variables $y_{ijk}$ and $\overline{y}_{ijk}$ are introduced as:

$$y_{ijk} = x_{ij} t_{jk}$$

$$\overline{y}_{ijk} = x_{ij} d_{ijk} \qquad (6).$$

In order to ensure the validity of equation (6), new constraints are added and have the binary forms as:

$$C_{4a} = \sum_{i=1}^{n}\sum_{j=1}^{m}\sum_{k=1}^{\overline{K}_{ij}} t_{jk}x_{ij} - 2t_{jk}y_{ijk} - 2x_{ij}y_{ijk} + 3y_{ijk} \qquad (7)$$

$$C_{4b} = \sum_{i=1}^{n}\sum_{j=1}^{m}\sum_{k=1}^{\overline{K}_{ij}} d_{ijk}x_{ij} - 2d_{ijk}\overline{y}_{ijk} - 2x_{ij}\overline{y}_{ijk} + 3\overline{y}_{ijk}.$$

For example, the total number of the resource blocks can be provided by one base station is equal to 273, and the binary form of the expression of the fourth constraint is:

$$C_4 = \sum_{j=1}^{m}\left(\sum_{i=1}^{n}\left(\sum_{k=1}^{\overline{K}_{ij}}10 y_{ijk} + \sum_{k=0}^{2}2^k \overline{y}_{ijk} + 2\overline{y}_{ij3}\right) + \sum_{k=0}^{8}2^k u_{jk} - 273\right)^2, \qquad (8)$$

where $u_{jk}$ is a slack variable.

The fifth constraint is the resource block distribution manner which is able to perform Round-Robin schedule, and the binary form of the expression thereof is:

$$C_5 = \sum_{j=1}^{m}\sum_{k=0}^{K_j - 1} t_{jk+1} - t_{jk+1}t_{jk}. \qquad (9)$$

The sixth constraint is that the handover behavior of user equipment needs to be controlled through the A3 event, and the binary form of the expression thereof is:

$$C_{6a} = \sum_{j=1}^{m}\sum_{i=1}^{n}\left((F_{ij} - F_{ij'} - 10)x_{ij} - CIO_{jj'} + 10 - \left(\sum_{k=0}^{5}2^k v_{ijk} + 47 v_{ij6}\right)\right)^2 \qquad (10)$$

$$C_{6b} = \sum_{j=1}^{m}\sum_{i=1}^{n}\left((F_{ij} - F_{ij'} + 10)x_{ij'} - CIO_{jj'} - 10 + \sum_{k=0}^{5}2^k x_{ijk} + 47 z_{ij6}\right)^2,$$

where $v_{ijk}$ and $z_{ijk}$ are slack variables, and $CIO_{jj'}$ is the CIO value between the base station BSj (the base station that may be connected to the user equipment UEi after handover) and the base station BSj' (the base station that currently serves the user equipment UEi). $CIO_{jj'}$ may be expressed through binary variable $e_{j'jk}$ as:

$$CIO_{jj'} = \sum_{k=0}^{3}2^k e_{j'jk} + 5e_{j'j4} - 10. \qquad (11)$$

If the quantum annealing algorithm is used to process a QUBO matrix formed by the throughput objection function and all the first to sixth constraints, each of the six constraints are multiplied by the corresponding penalty coefficient, and then all the products and the objective function are summed up to form the QUBO formulation Q as:

$$Q = Obj + p_1 C_1 + p_2 C_2 + p_3 C_3 + p_4 C_4 + p_{4a} C_{4a} + p_{4b} C_{4b} + p_5 C_5 + p_{6a} C_{6a} + p_{6b} C_{6b} \qquad (12).$$

The binary variables include $x_{ij}$, $t_{jk}$, $d_{ijk}$, $e_{j'jk}$, $y_{ijk}$ and $\overline{y}_{ijk}$, and the slack variables include $r_{jk}$, $s_{ijk}$, $u_{jk}$, $v_{ijk}$ and $z_{ijk}$. In the case that there are 7 base stations and 150 user equipments, the required number of quantum bits is 60284.

While according to the hybrid quantum-classical algorithm adopted by the network connection control system of the present disclosure, the classical algorithm is utilized to process the first, second and sixth constraints, and the quantum annealing algorithm is utilized to process the QUBO matrix formed by the throughput objective function and the third to fifth constraints only. Further, the binary form the expression of the fourth constraint becomes:

$$C_4 = \sum_{j=1}^{m}\left(\sum_{i=1}^{n} x_{ij}\left(\sum_{k=1}^{K_{ij}} 10 t_{jk} + \sum_{k=0}^{2} 2^k d_{ijk} + 2d_{ij3}\right) + \sum_{k=0}^{8} 2^k u_{jk} - 273\right)^2. \quad (13)$$

Since the variable $x_{ij}$ has been calculated by the classical algorithm already, the quantum annealing algorithm only need to consider the binary variables $t_{jk}$ and $d_{ijk}$ and the slack variables $s_{ijk}$ and $u_{jk}$. Accordingly, the required number of quantum bits is 12768, which has been decreased to be less than one quarter of the number of quantum bits required by adopting the quantum annealing algorithm only. Therefore, the present disclosure can greatly reduce the required number of quantum bits through adopting the hybrid approach that combines the quantum annealing algorithm and the classical algorithm for processing.

Figure 3:
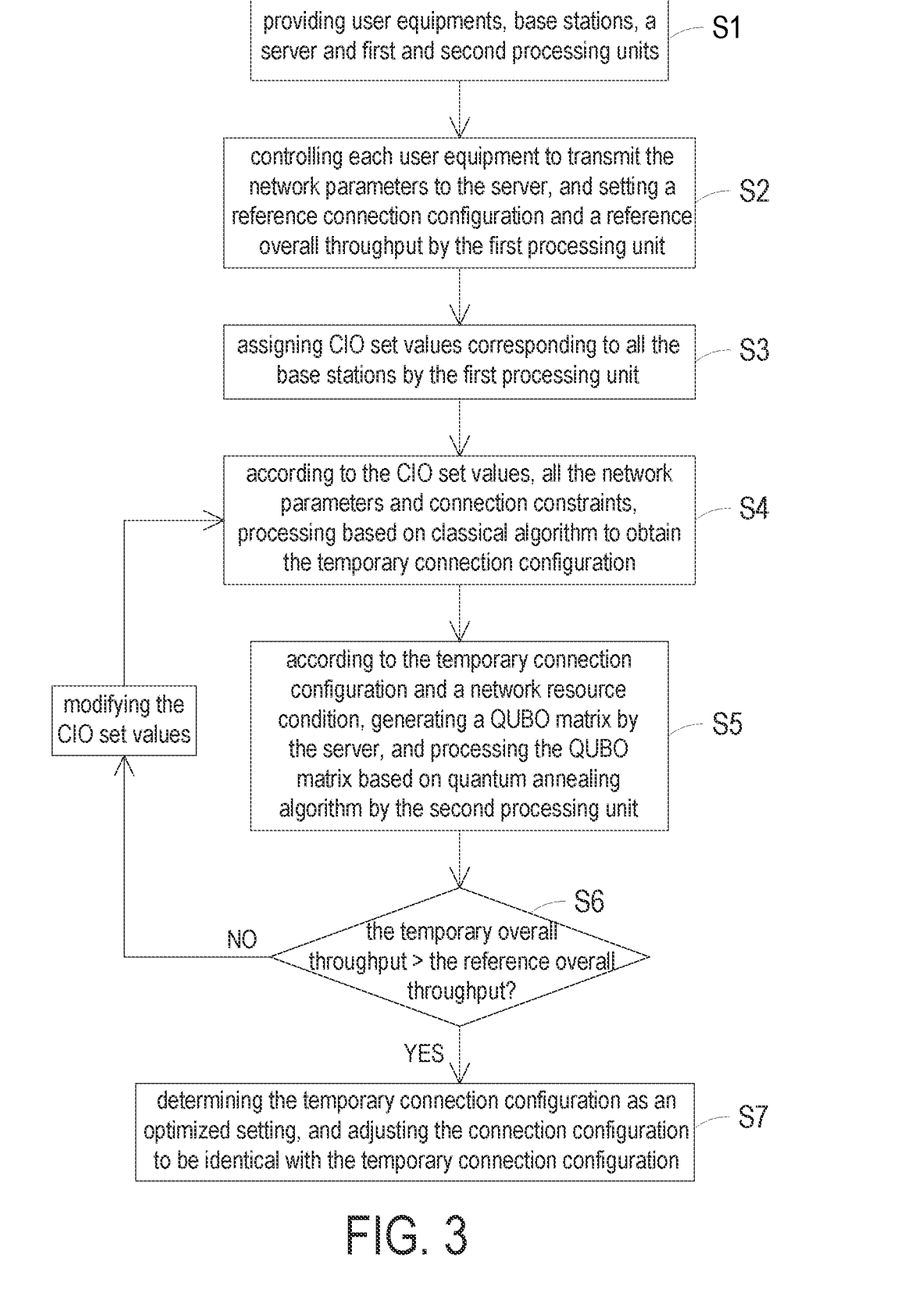
FIG. 3 is a schematic flow chart illustrating a network connection control method according to an embodiment of the present disclosure.

FIG. 3 is a schematic flow chart illustrating a network connection control method according to an embodiment of the present disclosure. The network connection control method is applicable to the network connection control system mentioned above. As shown in FIG. 3, the network connection control method includes the following steps.

First, in step S1, a plurality of user equipments, a plurality of base stations, a server 11, a first processing unit 12 and a second processing unit 13 are provided. Each base station has a connection range and is configured to connect with the user equipment located within the connection range thereof. The server 11 is in communication with all the base stations. The server 11 may control the connection range of each base station through adjusting the CIO values of the base stations. The first processing unit 12 and the second processing unit 13 are respectively in communication with the server 11.

Then, in step S2, each user equipment is controlled to transmit the network parameters between it and every base station to the server 11 through the base station connected therewith, the current connection configuration of all the user equipments and all the base stations is set as a reference connection configuration by the first processing unit 12, and a reference overall throughput is set according to a total of the throughput of all the user equipments under the reference connection configuration by the first processing unit 12.

Then, in step S3, a plurality of CIO set values corresponding to all the base stations are assigned by the first processing unit 12.

Then, in step S4, according to all the CIO set values, all the network parameters and connection constraints of all the user equipments and base stations, the first processing unit 12 is utilized to process based on the classical algorithm to obtain the corresponding temporary connection configuration.

Next, in step S5, according to the temporary connection configuration and a network resource condition, a QUBO matrix is generated by the server 11, the QUBO matrix is processed based on quantum annealing algorithm by the second processing unit 13 to obtain the temporary overall throughput of all the user equipments.

Afterwards, in step S6, whether the temporary overall throughput is greater than the reference overall throughput is confirmed. If the temporary overall throughput is confirmed to be greater than the reference overall throughput in step S6, the step S7 is performed. In step S7, the temporary connection configuration is determined as an optimized setting, and the connection configuration is adjusted to be identical with the temporary connection configuration. On the contrary, if the temporary overall throughput is confirmed to be less than or equal to the reference overall throughput in step S6, the CIO set values are modified by the first processing unit 12, and the step S4 is performed again.

Figure 4:
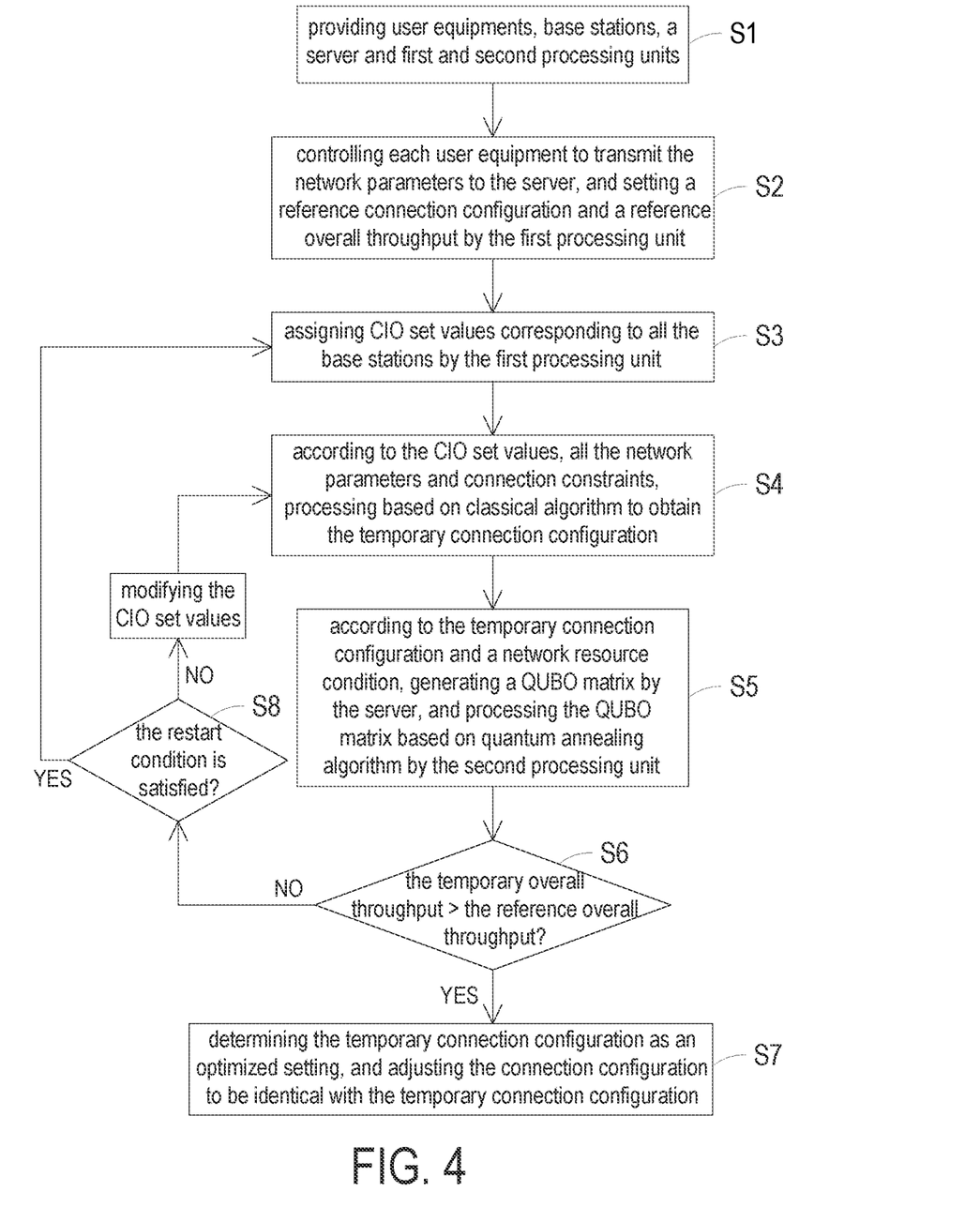
FIG. 4 is a schematic flow chart illustrating a variant of the network connection control method of FIG. 3.

FIG. 4 is a schematic flow chart illustrating a variant of the network connection control method of FIG. 3. In an embodiment, as shown in FIG. 4, the network connection control method further performs a step S8 after confirming that the temporary overall throughput is less than or equal to the reference overall throughput in step S6. In step S8, whether the restart condition is satisfied is determined. The restart condition may include that a preset time has passed after performing the step S3 last time or that the number of times of performing the step S6 after performing the step S3 last time exceeds a preset number of times, but not exclusively.

If the determination result of step S8 is positive (i.e., the restart condition is satisfied), the step S3 is performed again. If the determination result of step S8 is negative (i.e., the restart condition is not satisfied), the CIO set values are modified by the first processing unit 12, and the step S4 is performed again.

In summary, the present disclosure provides a network connection control system and method. In the network connection control system and method, an optimized connection configuration of all the user equipments and all the base stations is obtained through the processing based on hybrid quantum-classical algorithm, and the connection ranges of all the base stations are controlled to realize the optimized connection configuration. Accordingly, the network connection control system and method of the present disclosure is able to find out the currently optimal connection configuration at any time point so as to realize the load balancing of the overall network and the best overall throughput. In addition, through adopting the hybrid approach that combines the quantum annealing algorithm and the classical algorithm for processing, the required number of quantum bits is greatly reduced. Further, even when the network field is replaced or changed, there is no need to perform the data collection and the model training again, resulting in good expandability of the network connection control system and method of the present disclosure.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A network connection control system, comprising:
   a plurality of user equipments;
   a plurality of base stations, each having a connection range and configured to connect with the user equipment located within the connection range;
   a server in communication with the plurality of base stations, wherein the server controls the connection range of each of the plurality of base stations through adjusting CIO (cell individual offset) values of the plurality of base stations; and a first processing unit and a second processing unit in communication with the server respectively, wherein each of the plurality of user equipments transmits a network parameter between the user equipment and every one of the plurality of base stations to the server through the base station connected therewith, the first processing unit sets current connection configuration of the plurality of user equipments and the plurality of base stations as a reference connection configuration and sets a reference overall throughput according to a total throughput of the plurality of user equipments under the reference connection configuration, and the first processing unit assigns a plurality of CIO set values corresponding to the plurality of base stations, wherein the network connection control system is configured to perform an optimizing procedure, in the optimizing procedure, the first processing unit processes based on classical algorithm according to the plurality of CIO set values, all the network parameters, and connection constraints of the plurality of user equipments and the plurality of base stations to obtain a temporary connection configuration; the server generates a QUBO matrix according to the temporary connection configuration and a network resource condition; the second processing unit processes the QUBO matrix based on quantum annealing algorithm to obtain a temporary overall throughput of the plurality of user equipments; and the first processing unit confirms whether the temporary overall throughput is greater than the reference overall throughput, wherein if the first processing unit confirms that the temporary overall throughput is greater than the reference overall throughput, the temporary connection configuration is determined as an optimized setting, and the server adjusts the connection configuration to be identical with the temporary connection configuration.

2. The network connection control system according to claim 1, wherein the connection constraints comprise a requirement that each of the plurality of user equipments is connected to one of the plurality of base stations and/or a maximum number of the user equipments connected to each of the plurality of base stations.

3. The network connection control system according to claim 1, wherein the network resource condition comprises all the network parameters, a throughput objective function and network resource constraints of the plurality of user equipments and the plurality of base stations, and the network resource constraints comprise at least one of a requirement that a number of resource blocks allocated to the user equipment should not exceed a number of resource blocks required by the user equipment, a total number of resource blocks provided by one of the plurality of base stations, and a resource block distribution manner capable of performing Round-Robin schedule.

4. The network connection control system according to claim 1, wherein the reference overall throughput is equal to 1.1 times the total throughput of the plurality of user equipments under the reference connection configuration.

5. The network connection control system according to claim 1, wherein if the first processing unit confirms that the temporary overall throughput is less than or equal to the reference overall throughput, the first processing unit modifies the plurality of CIO set values, and the network connection control system performs the optimizing procedure again.

6. The network connection control system according to claim 1, wherein if the first processing unit confirms that the temporary overall throughput is less than or equal to the reference overall throughput, the first processing unit further determines whether a preset time has passed after assigning the plurality of CIO set values, wherein if the determination result is positive, the first processing unit reassigns the plurality of CIO set values, and the network connection control system performs the optimizing procedure again; and if the determination result is negative, the first processing unit modifies the plurality of CIO set values, and the network connection control system performs the optimizing procedure again.

7. The network connection control system according to claim 1, wherein if the first processing unit confirms that the temporary overall throughput is less than or equal to the reference overall throughput, the first processing unit further determines whether a number of times of performing the optimizing procedure after assigning the plurality of CIO set values last time exceeds a preset number of times, wherein if the determination result is positive, the first processing unit reassigns the plurality of CIO set values, and the network connection control system performs the optimizing procedure again; and if the determination result is negative, the first processing unit modifies the plurality of CIO set values, and the network connection control system performs the optimizing procedure again.

8. The network connection control system according to claim 1, wherein the network parameter comprises at least one of a number of resource blocks required for connecting the user equipment to the base station, an RSRP (reference signal received power) between the user equipment and the base station, and an SINR (signal to interference plus noise ratio) between the user equipment and the base station.

9. The network connection control system according to claim 1, wherein the network connection control system is applied to 5G network, the connection constraints comprise an A3 event, and the A3 event represents that the base station connected to the user equipment is switched from a first one of the plurality of base stations to a second one of the plurality of base stations when a trigger condition is satisfied.

10. The network connection control system according to claim 9, wherein the trigger condition is that a difference of subtracting the RSRP between the user equipment and the first one of the plurality of base stations from the RSRP between the user equipment and the second one of the plurality of base stations is greater than the CIO value between the first and second ones of the plurality of base stations.

11. The network connection control system according to claim 1, wherein the quantum annealing algorithm used by the second processing unit comprises SA (simulated annealing), DA (digital annealing), SQA (simulated quantum annealing) or SBA (simulated bifurcation algorithm).

12. A network connection control method, comprising steps of:
(a) providing a plurality of user equipments, a plurality of base stations, a server, a first processing unit and a second processing unit, wherein each of the plurality of base stations has a connection range and is configured to connect with the user equipment located within the connection range, the server is in communication with the plurality of base stations and controls the connection range of each of the plurality of base stations through adjusting CIO (cell individual offset) values of the plurality of base stations, and the first processing unit and the second processing unit are respectively in communication with the server;

(b) controlling each of the plurality of user equipments to transmit a network parameter between the user equipment and every one of the plurality of base stations to the server through the base station connected therewith, setting current connection configuration of the plurality of user equipments and the plurality of base stations as a reference connection configuration by the first processing unit, and setting a reference overall throughput according to a total throughput of the plurality of user equipments under the reference connection configuration by the first processing unit;

(c) assigning a plurality of CIO set values corresponding to the plurality of base stations by the first processing unit;

(d) according to the plurality of CIO set values, all the network parameters, and connection constraints of the plurality of user equipments and the plurality of base stations, processing based on classical algorithm to obtain a temporary connection configuration by the first processing unit;

(e) generating a QUBO matrix according to the temporary connection configuration and a network resource condition by the server, and processing the QUBO matrix based on quantum annealing algorithm to obtain a temporary overall throughput of the plurality of user equipments by the second processing unit;

(f) confirming whether the temporary overall throughput is greater than the reference overall throughput; and (g) if the temporary overall throughput is confirmed to be greater than the reference overall throughput, determining the temporary connection configuration as an optimized setting, and adjusting the connection configuration to be identical with the temporary connection configuration.

13. The network connection control method according to claim 12, wherein the connection constraints comprise a requirement that each of the plurality of user equipments is connected to one of the plurality of base stations and/or a maximum number of the user equipments connected to each of the plurality of base stations.

14. The network connection control method according to claim 12, wherein the network resource condition comprises all the network parameters, a throughput objective function and network resource constraints of the plurality of user equipments and the plurality of base stations, and the network resource constraints comprise at least one of a requirement that a number of resource blocks allocated to the user equipment should not exceed a number of resource blocks required by the user equipment, a total number of resource blocks provided by one of the plurality of base stations, and a resource block distribution manner capable of performing Round-Robin schedule.

15. The network connection control method according to claim 12, wherein the reference overall throughput is equal to 1.1 times the total throughput of the plurality of user equipments under the reference connection configuration.

16. The network connection control method according to claim 12, wherein if the temporary overall throughput is confirmed to be less than or equal to the reference overall throughput, the plurality of CIO set values are modified by the first processing unit, and the step (d) is performed again.

17. The network connection control method according to claim 12, further comprising a step of:

(h) if the temporary overall throughput is confirmed to be less than or equal to the reference overall throughput, determining whether a preset time has passed after performing the step (c) last time, wherein if the determination result is positive, the step (c) is performed again; and if the determination result is negative, the plurality of CIO set values are modified by the first processing unit, and the step (d) is performed again.

18. The network connection control method according to claim 12, further comprising a step of:

(i) if the temporary overall throughput is confirmed to be less than or equal to the reference overall throughput, determining whether a number of times of performing the step (f) after assigning the plurality of CIO set values last time exceeds a preset number of times, wherein if the determination result is positive, the step (c) is performed again; and if the determination result is negative, the plurality of CIO set values are modified by the first processing unit, and the step (d) is performed again.

19. The network connection control method according to claim 12, wherein the network parameter comprises at least one of a number of resource blocks required for connecting the user equipment to the base station, an RSRP between the user equipment and the base station, and an SINR between the user equipment and the base station.

20. The network connection control method according to claim 12, wherein the network connection control system is applied to 5G network, the connection constraints comprise an A3 event, and the A3 event represents that the base station connected to the user equipment is switched from a first one of the plurality of base stations to a second one of the plurality of base stations when a trigger condition is satisfied.

21. The network connection control method according to claim 20, wherein the trigger condition is that a difference of subtracting the RSRP between the user equipment and the first one of the plurality of base stations from the RSRP between the user equipment and the second one of the plurality of base stations is greater than the CIO value between the first and second ones of the plurality of base stations.

22. The network connection control method according to claim 12, wherein the quantum annealing algorithm used by the second processing unit comprises SA, DA, SQA or SBA.

\* \* \* \* \*